United States Patent [19]

Lin

[11] Patent No.: US 6,298,318 B1
[45] Date of Patent: Oct. 2, 2001

(54) REAL-TIME IMU SIGNAL EMULATION METHOD FOR TEST OF GUIDANCE NAVIGATION AND CONTROL SYSTEMS

(76) Inventor: Ching-Fang Lin, 9131 Mason Ave., Chatsworth, CA (US) 91311

( * ) Notice: Subject to any disclaimer, the term of this patent is extended or adjusted under 35 U.S.C. 154(b) by 0 days.

(21) Appl. No.: 09/108,595

(22) Filed: Jul. 1, 1998

(51) Int. Cl.[7] ................................ G06F 17/50; G06F 9/45
(52) U.S. Cl. ................................ 703/23; 703/21; 703/13; 703/24; 434/30; 434/2
(58) Field of Search ................................ 703/13, 20, 21, 703/22, 24, 6, 23; 434/30, 35, 2

(56) References Cited

U.S. PATENT DOCUMENTS

| | | | |
|---|---|---|---|
| 4,424,038 | * | 1/1984 | Tingleff et al. ........................... 434/2 |
| 5,228,854 | * | 7/1993 | Eldridge ................................. 434/11 |
| 5,260,874 | * | 11/1993 | Berner et al. ........................... 701/33 |
| 5,378,155 | * | 1/1995 | Eldridge ................................. 434/11 |
| 5,388,990 | * | 2/1995 | Beckman ............................... 434/38 |
| 5,429,322 | * | 7/1995 | Waymeyer ........................... 244/3.15 |
| 5,495,562 | * | 2/1996 | Denney et al. ....................... 395/121 |
| 5,541,863 | * | 7/1996 | Magor et al. ........................ 702/122 |
| 5,543,804 | * | 8/1996 | Buchler et al. ....................... 342/357 |
| 5,549,477 | * | 8/1996 | Tran et al. .............................. 434/5 |
| 5,610,815 | * | 3/1997 | Gudat et al. ........................... 701/23 |
| 5,790,438 | * | 8/1998 | Simonnet .............................. 702/122 |
| 5,950,965 | * | 9/1999 | Epstein et al. .................... 244/158 R |
| 6,127,970 | * | 10/2000 | Lin ................................... 342/357.14 |

* cited by examiner

Primary Examiner—Kevin J. Teska
Assistant Examiner—William Thomson
(74) Attorney, Agent, or Firm—Raymond Y. Chan; David and Raymond Patent Group

(57) ABSTRACT

A real-time IMU emulation method for GNC method includes the step of receiving real-time flight data from a 6DOF flight simulator and generating simulated IMU electronic signals according to the IMU measurement modules and error modules defined by the user, and injecting said simulated IMU electronic signals into an on-board GNC system which causes the on-board GNC system into "thinking" that the vehicle is really moving. The on-board GNC system which is installed on the vehicle is motionless during the emulation test, so that the testing can be carried out in a laboratory or in an anechoic chamber facility and the IMU emulation can achieve the easy, effective, and least intrusive injection of emulated IMU signals into the INS computer. The present invention has features supporting the final integration of a developmental Guidance, Navigation, or Control (GNC) system installed into a vehicle. It assures testers that GNC avionics on-board vehicle work properly before and during a flight test. It also helps to debug on-board GNC avionics and verify system performance.

39 Claims, 6 Drawing Sheets

REAL-TIME IMU SIGNAL EMULATION METHOD FOR TEST OF GUIDANCE NAVIGATION AND CONTROL SYSTEMS

FIELD OF THE INVENTION

The present invention relates to IMU emulation, and more particularly to a real-time emulation method for ground test or hardware-in-the-loop test of GNC system, which allows unlimited dynamic 6DOF trajectory simulation of IMU for performing accurate test for the GNC system.

BACKGROUND OF THE PRESENT INVENTION

There are commonly unsolved difficult problems in the ground tests and laboratory hardware-in-the-loop tests of the inertial and integrated Guidance, Navigation, and Control (GNC) system on-board a military missile or a vehicle such as aircraft, spacecraft, ship, and car.

In the ground test, since the vehicle is stationary, the IMU in the GNC system can not produce dynamic electronic signals for it is a self-contained device. In other words, it is unable to test the accuracy and errors of the GNC system installed on-board vehicle while it is stationary. If the IMU and the GNC system are installed on-board a ground vehicle such as a car or a combat tank, the tester can still process a motion test for the IMU by actually driving the ground vehicle in relatively low cost. However, if the vehicle to be test is an aircraft or even a spacecraft, the cost and labors for actual-fly test are ultimately expensive.

In order to verify the correctness and/or evaluate the performance of an integrated GPS/INS system on the ground, before a real flight test or in the laboratory, the GPS/INS system must be excited by its dynamic sensor signals, as if the GPS/INS system were under an actual dynamic flight condition. Motion table approaches can put the GPS/INS system into actual motion and provide dynamic excitation to the system. But these approaches are usually costly, inconvenient, and even inaccurate.

A straightforward method for dynamic ground testing is the application of the flight motion tables that provide the motion of the vehicle during emulated flight in an installed system environment. With this method, the GPS receiver receives actual satellite RF signals and the IMU produces dynamic inertial measurement signals itself, for the integrated system is actually in motion. But this test method is not a viable solution. It needs a large set of testing equipment, its operational cost is high, its dynamic motion is limited, and its data acquisition during the emulation is not convenient. In fact, the motion table method is very much limited in the dynamic trajectory emulation. The rate table can only produce angular motion in one axis and it can not produce transnational motion. The centrifuge can only produce one or two direction acceleration and one angular rate and the motion of the IMU system is limited to a small space.

SUMMARY OF THE PRESENT INVENTION

Therefore the real-time computer emulation method for dynamic ground testing is desired.

It is thus a first object of the present invention to provide a real-time IMU emulation method in which the installed system on the vehicle is motionless during the emulation test, so the testing can be carried out in a laboratory or in an anechoic chamber facility and the IMU emulation can achieve the easy, effective, and least intrusive injection of emulated IMU signals into the INS computer.

A further object of the present invention is to provide a real-time IMU emulation method that generates IMU signals on the ground, under static conditions, identical to what would be encountered if the vehicle were flying. The present invention has features supporting the final integration of a developmental Guidance, Navigation, or Control (GNC) system installed into a vehicle. It assures testers that GNC avionics on-board vehicle work properly before and during a flight test. It also helps to debug on-board GNC avionics and verify system performance.

Another object of the present invention is to provide a real-time IMU emulation method, which receives real-time flight data from the 6DOF flight simulator and generates IMU electronic signals according to the IMU measurement modules and error modules defined by the user. The emulated electronic signals are injected into the installed avionics system, which causes the on-board GNC system computer into "thinking" that the vehicle is really moving.

Another object of the present invention is to provide a real-time IMU emulation method which allows unlimited dynamic 6DOF trajectory simulation because the motion devices are removed from the test system. Only with the IMU emulation method and the corresponding system can the tester be able to test the GNC system performance over a real mission trajectory.

Another object of the present invention is to provide a real-time IMU emulation method that is efficiently utilized for ground test of installed systems, laboratory hard-in-the-loop dynamic simulation, and GNC system analysis and development.

Another object of the present invention is to provide a real-time IMU emulation method that can perform accurate test for the GNC system. In the simulated test, the reference trajectory is accurate and known, since it is defined by the tester, so that the high accuracy of the simulated method is very useful for the performance verification of the GNC system.

Another object of the present invention is to provide a real-time IMU emulation method adapted to predict and evaluate the dynamic GNC performance through a simulated test, which can make the follow on real flight test safer and will greatly reduce the number of the real flight test. Consequently, the operation and test cost of the simulated method is low for it does not need the expensive motion device in the test system. The maintenance of the test system is simplified.

Another object of the present invention is to provide a real-time IMU emulation method which includes the steps of emulating the behavior of a real IMU as defined by the user, producing dynamic electronic IMU signals and injecting these signals into the integration system to be tested, and bypassing the real IMU in the tested system since the IMU can not produce dynamic signals when the system is stationary because of its self-contained characteristics

DETAILED DESCRIPTION OF THE PREFERRED EMBODIMENT

The present invention can substantially solve the problems in the ground test and hardware-in-loop test of inertial and integrated GNC system on-board an aircraft, spacecraft, or other vehicles. In the ground test, since the vehicle is stationary, the IMU in the GNC system can not produce dynamic electronic signals because it is a self-contained device. In order to carry out dynamic simulation test on the ground, the present invention provides a real-time IMU emulation method that excites the GNC system on-board vehicle and makes it possible to predict and evaluate the dynamic GNC performance through a simulated test, which can make the follow on real flight test safer and will great reduce the flight number, and consequently, the test cost.

The present invention is based on advanced real-time simulation, computation, and electronic technologies. An IMU model is embedded in a host computer. The IMU model comprises a gyroscope model and an accelerometer model. The practical gyroscope model or accelerometer model should include a measurement model and an error module.

Figure 1:
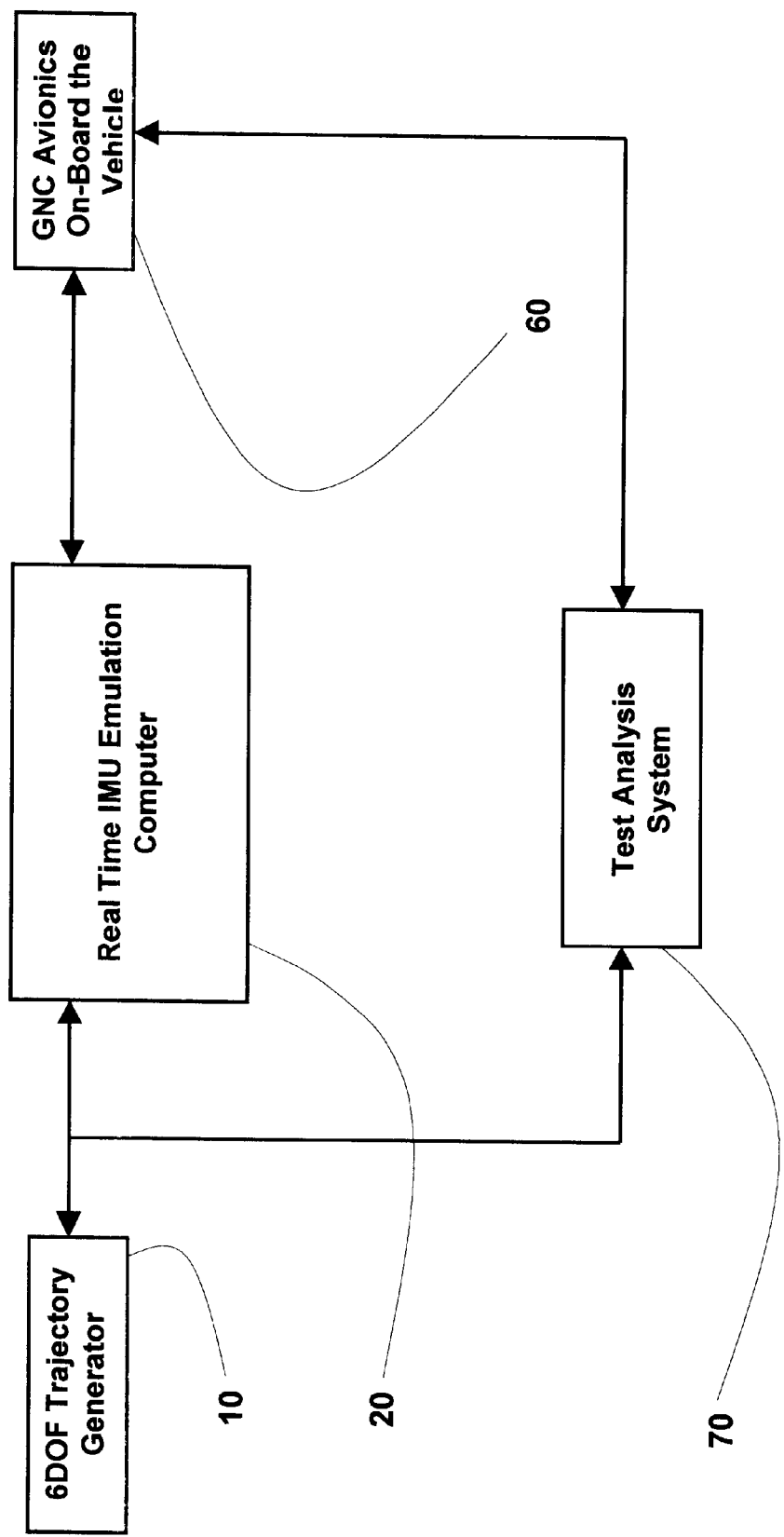
FIG. 1 is a block diagram illustrating a real-time IMU emulation system equipped with a 6DOF trajectory generator, a test analysis system and a GNC avionics on-board a vehicle according to a preferred embodiment of the present invention.
Figure 2:
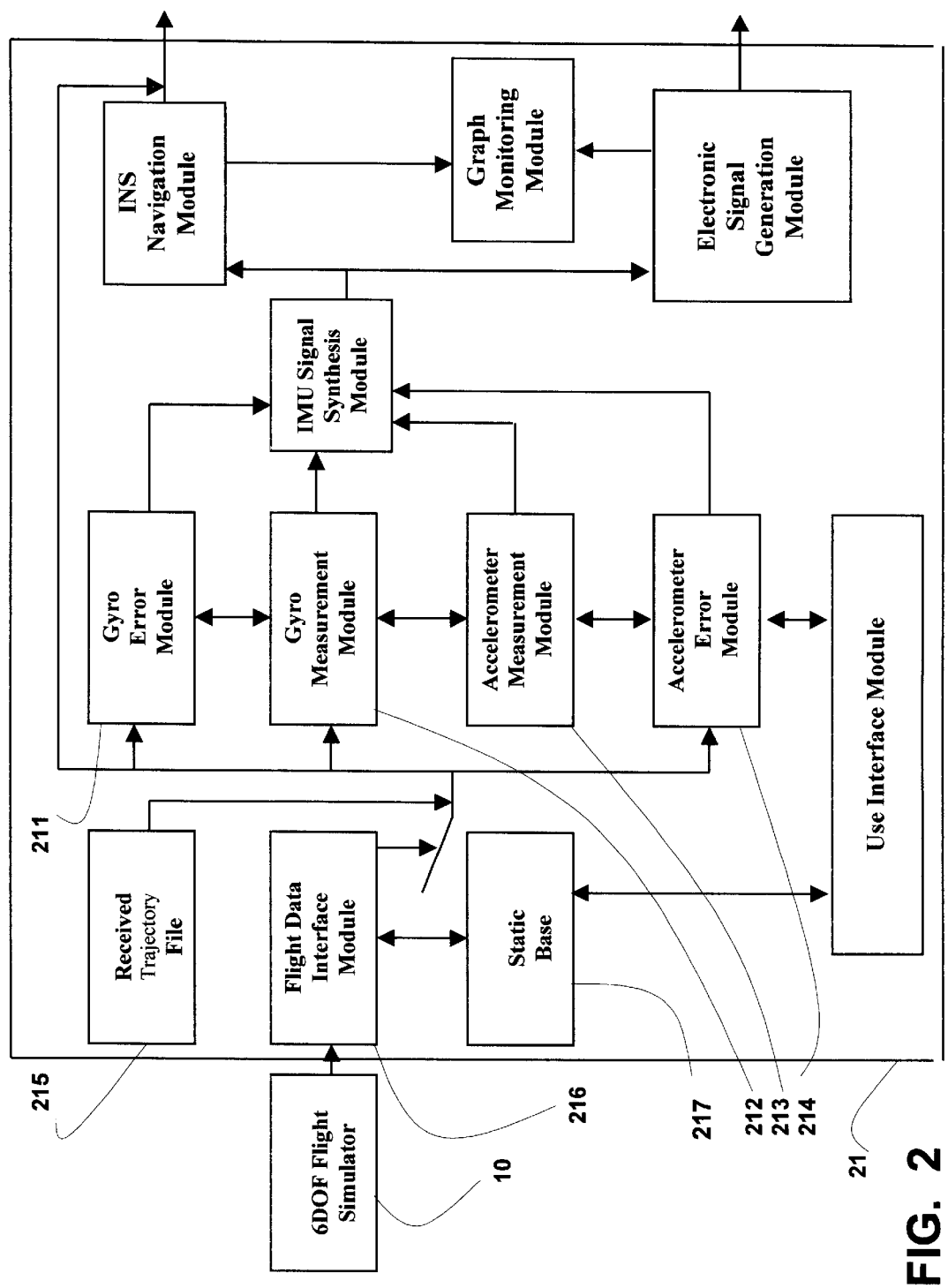
FIG. 2 is a block diagram of a real-time IMU emulation method according to the above preferred embodiment of the present invention.

To process the real-time IMU emulation method of the present invention, as shown in FIG. 1, a 6DOF trajectory generator 10 is connected a real-time IMU emulation system 20 which is connected to a GNC avionics on-board vehicle 60 for bypassing the real IMU in the GNC system of the vehicle.

The real-time IMU emulation method for GNC system of the present invention comprises the steps as follows:

(1) Input IMU measurement modules and IMU error modules into the real-time IMU emulation system 20 according to the real IMU device of the GNC system to be tested. The IMU measurement modules consist of gyro measurement model and accelerometer measurement model, which are determined by the inertial sensor principles. The IMU error modules consist of gyro error module and accelerometer error module, which are defined by the user according to the actual IMU used in the GNC system to be tested.

(2) Produce a real-time trajectory data from a 6DOF trajectory generator 10 and send the real-time trajectory data to the real-time IMU emulation system 20. The real-time trajectory data are defined by the user. The real-time IMU emulation system 20 will produce IMU signals as if a vehicle is really transporting along the user-defined trajectory.

(3) Generate output data that are real-time IMU data identical to the real IMU device in the designated mission by the IMU model of the real-time IMU emulation system 20. The real-time IMU data are determined by the 6DOF trajectory data, the IMU measurement modules, and the IMU error modules.

(4) Convert the real-time IMU data into Simulated IMU electronic signals by an IMU signal generator in a simulator of the real-time IMU emulation system 20. The IMU signal generator is in fact an interface board in the emulation computer. The IMU signal generator produces the Simulated IMU electronic signals that are identical to those produced by the real IMU in the GNC system. Thus, it can replace the real IMU, and makes the GNC system into "thinking" that it is connected to a real IMU.

(5) Process the generated Simulated IMU electronic signals by a regulator and connector circuit to form suitable electrical specifications and connector pin arrangement that is compatible to the GNC/IMU interface.

(6) Inject the electronic signals into the on-board GNC system to excite the GNC system of the GNC avionics on-board vehicle. With the dynamic 6DOF trajectory and compatible electronic signals, the real-time IMU emulation system 20 is able to cause the GNC system computer of the GNC avionics on-board vehicle into "thinking" the vehicle is really transporting and the GNC system is receiving signals from a real IMU. When the GNC system is excited in dynamic operation, we can test it and evaluate its performance as if we carry out a real transportation test.

(7) Collect test data from the GNC system by a computer system during the test. Usually, we can compare the reference 6DOF trajectory data with the GNC resolved vehicle trajectory data to determine if the GNC system works properly and to evaluate its performance.

The real-time IMU emulation system 20 is used as an installed system test equipment to support the final integration of a developmental GNC system installed into an aircraft according to this preferred embodiment. Of course, the present invention can also be applied to other vehicles such as cars, trucks, ships, or military missiles, etc. The present invention assures testers that the GNC avionics on-board aircraft works properly before and during a flight test. It helps to debug on-board GNC avionics and verify system performance.

The real-time emulation system receives real-time flight data from the 6DOF flight trajectory generator and produces simulated IMU electronic signals according to the IMU measurement modules and error modules defined by the user. Simulated IMU electronic signals are injected into the installed avionics system, which causes the on-board GNC system computer into working as if the aircraft is really flying. The real-time IMU emulation method of the present invention is efficiently utilized for ground test of installed systems, laboratory hardware-in-the-loop dynamic simulation and GNC system analysis and development.

The real-time IMU emulation system 20 mainly comprises an IMU emulation computer 21 which is an open standard bus computer, an IMU electronic signal generator 30 which is a set of plug-in interfaces, an Ethernet network controller board 40, and a signal regulator and connector board 50.

The IMU emulation computer 21 is the computation platform for the real-time IMU emulation system 20, which can be an open architecture based industrial computer comprising a plurality of off-the-shelf open standard bus modules, including a Gyro error module 211, a Gyro measurement module 212, an accelerometer measurement module 213, and an accelerometer error module 214, which are implemented by software. Since the open standard bus computer 21 is a standard open architecture, it provides great flexibility to our system design and can be configured according to the application situation. In other words, the utilizing of this open structure computation platform provides advantages of hardware configurability and implementation flexibility.

The IMU electronic signal generator 30 includes an analog signal interface 31, a serial signal interface 32, a pulse signal interface 33, and/or a parallel digital signal interface, which are installed between the IMU emulation computer 21 and the vehicle's avionics system 60 to be tested. They are used to convert the compute-produced data into a kind of signal that can be injected into the vehicle's avionics system 60. The generated signals must be identical to those signals produced by the real IMU that is replaced by the IMU emulation computer 21. But there are many types of gyros and accelerometers which are fabricated by different manufacturers and have various signal types and connector requirements. Therefore, the core technology in the IMU emulation computer 21 is the electronic signal generation and its interface to the installed avionics system 60. The software implements the IMU measurement modules and parameters. The hardware converts the simulated IMU outputs into electronic signals and injects the signals into the installed avionics system 60. The injected signals must be compatible with the electronics of the on-board INS/GPS system and the injection method must present the least intrusion to the installed avionics system 60. The real-time IMU emulation system 20 resolves the problems, which is a practical, reliable, versatile and user-friendly equipment.

Figure 3:
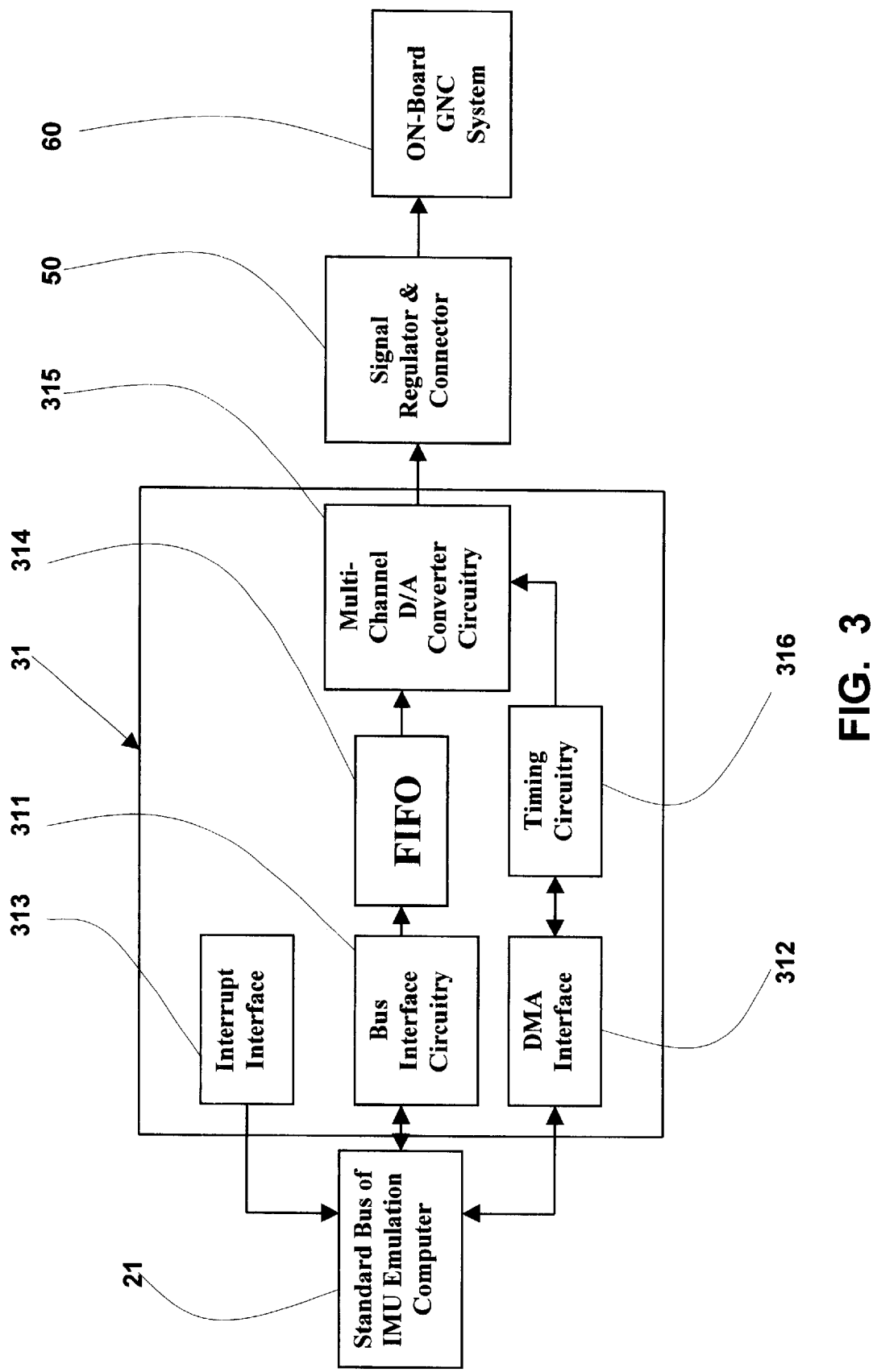
FIG. 3 is a block diagram of an analog signal interface according to the above preferred embodiment of the present invention.

In many commercial and military applications, the outputs of the IMU are analog signals, especially for low performance IMUs, which are often used with a GPS receiver to form an integrated system. As shown in FIG. 3, the analog signal interface 31 is a multi-channel D/A converter circuit board for generating analog IMU signals, which comprises a bus interface circuitry 311, a DMA interface 312 and an interrupt interface 313 respectively connected to the standard bus of the IMU emulation computer 21. The analog signal interface 31 further comprises a FIFO circuitry connected with the bus interface circuitry 311, a multi-channel D/A converter circuitry 315 connected between the FIFO circuitry 314 and an analog signal regulator and/or isolator 51 of the signal regulator and connector board 50, and a timing circuitry 316 connected between the DMA interface 312 and the multi-channel D/A converter circuitry 315.

Figure 4:
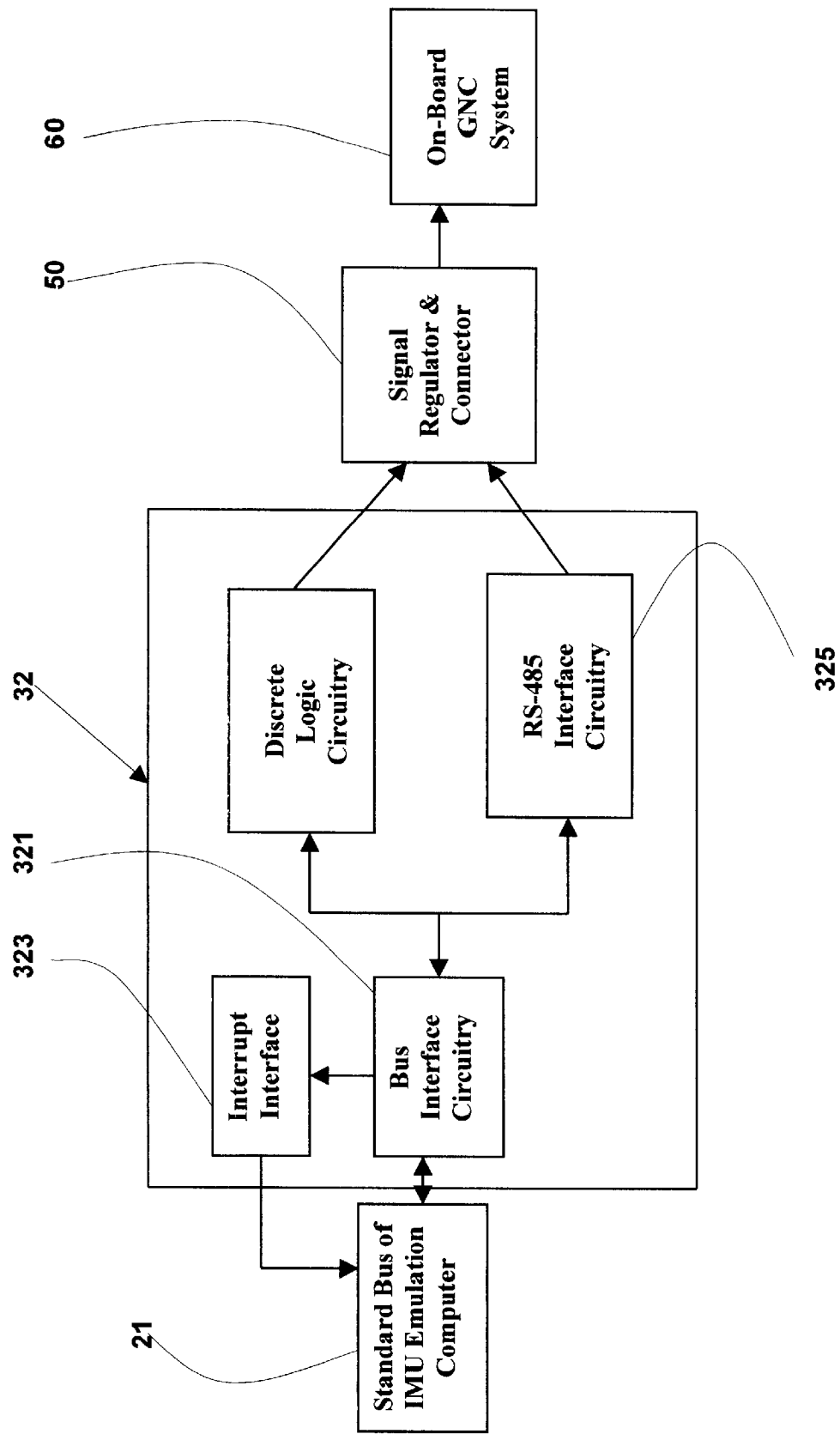
FIG. 4 is a block diagram of a serial signal interface according to the above preferred embodiment of the present invention.

Since most IMU manufacturers trend to embed a high performance microprocessor into the IMU to form a so-called "smart" IMU, in which the IMU output signals are sent out by the microprocessor through a standard serial bus, for example, RS-422/485, 1533 bus, etc., as shown in FIG. 4, the serial signal interface 32 is a multi-channel RS-422/485 communication control circuit board for generating serial IMU signals, which comprises a bus interface circuitry 321 connected with the standard bus of the IMU emulation computer 21, an interrupt interface 323 connected between the bus interface circuitry 321 and the standard bus of the IMU emulation computer 21, a discrete logic circuitry 324 connected between the bus interface circuitry 321 and a serial signal regulator and connector 52 of the signal regulator and connector board 50, and a RS-485 interface circuitry 325 connected between the bus interface circuitry 321 and the signal regulator and connector 52 of the signal regulator and connector board 50.

Figure 5:
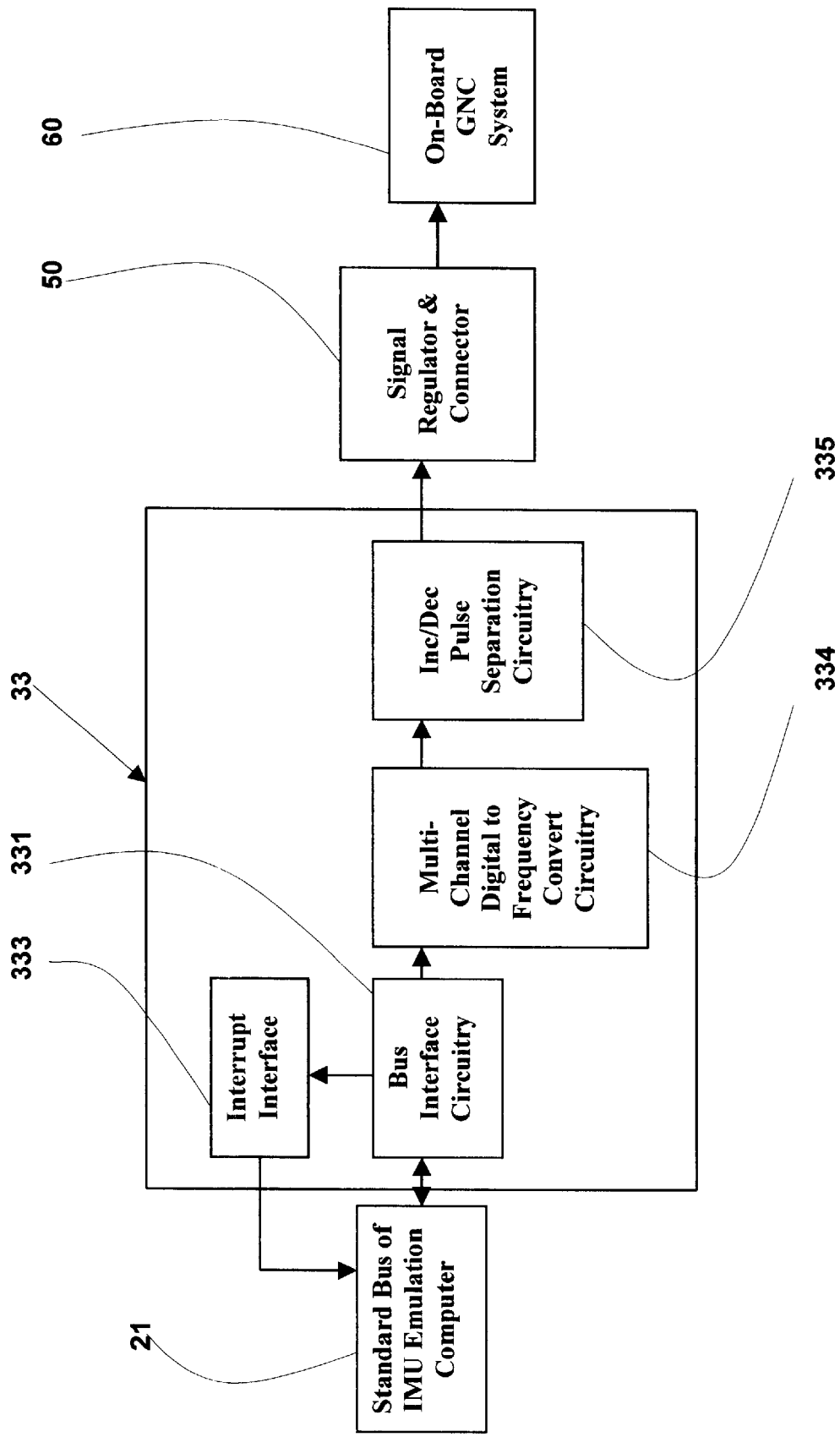
FIG. 5 is a block diagram of a pulse signal interface according to the above preferred embodiment of the present invention.

Most high performance gyros and accelerometers provide pulse outputs, RLG and FOG are inherently digital sensors, and many high performance electromechanical gyros and accelerometers have a pulse modulated force rebalance loop. Pulse output signals have many advantages over analog signals. As shown in FIG. 5, the pulse signal interface 33 is a multi-channel digital controlled frequency generator circuit board 33 for producing pulse IMU signals, which comprises bus interface circuitry 331 connected with the standard bus of the IMU emulation computer 21, an interrupt interface 333 connected between the bus interface circuitry 331 and the standard bus of the IMU emulation computer 21, a multi-channel digital to frequency convert circuitry 334 connected with the bust interface circuitry 331, and a Inc/Dec pulse separation circuitry 335 connected between the multi-channel digital to frequency convert circuitry 334 and a pulse signal regulator and connector 53 of the signal regulator and connector board 50.

Figure 6:
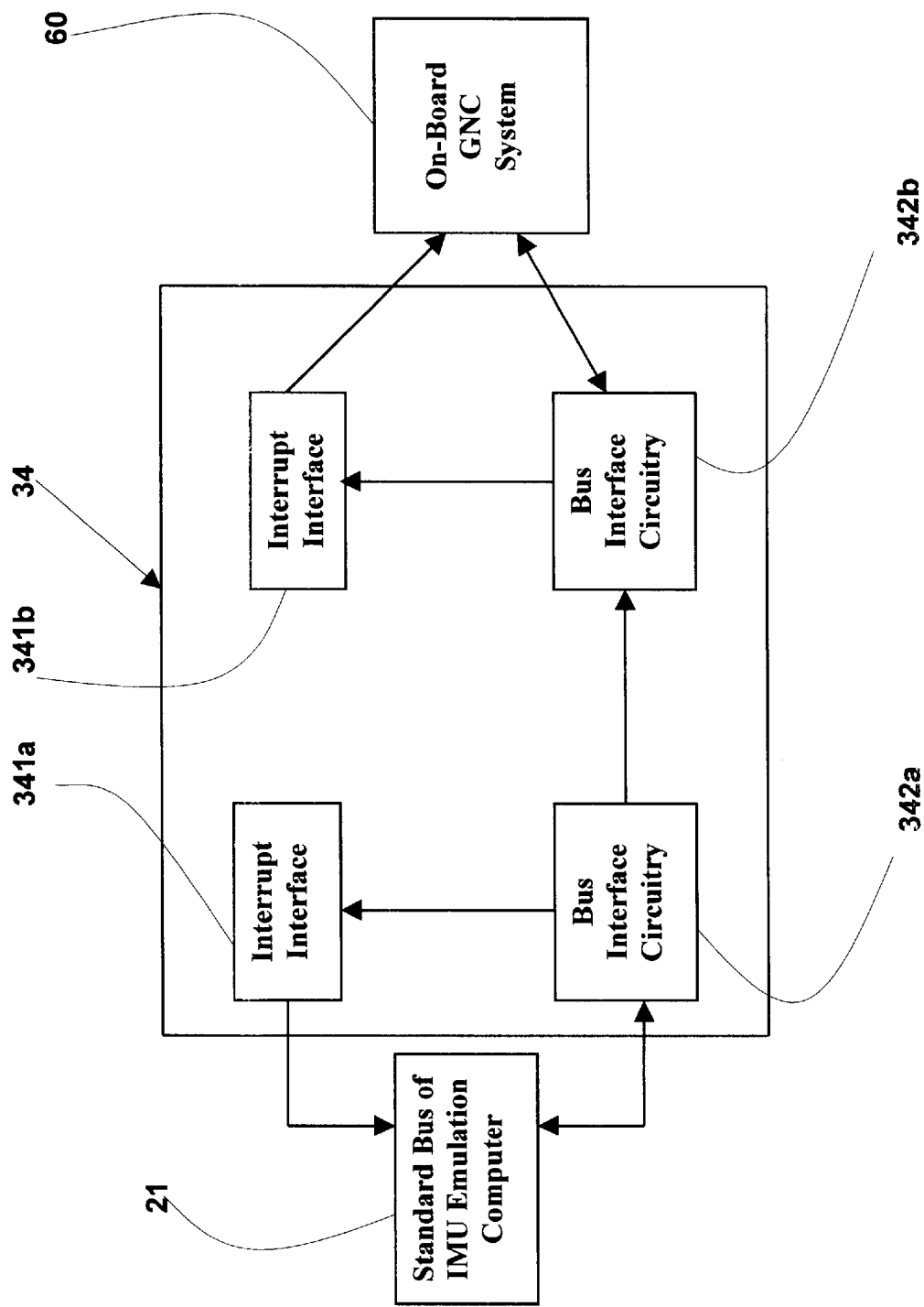
FIG. 6 is a block diagram of a parallel digital signal interface according to the above preferred embodiment of the present invention.

Some IMUs have embedded logic circuits or microprocessors which can output parallel digital signals or even implement a standard parallel bus. In the INS, this type of IMU can send signals to the parallel interface of the INS computer or to the backplace bus of the navigation system. As shown in FIG. 6, the parallel digital signal interface 34 comprises two sets of interrupt interfaces 341a, 341b and bus interface circuitries 342a, 342b, wherein the first set of the interrupt interface 341a and bus interface circuitry 342a are mutual connected and respectively connected to the standard bus of IMU emulation computer 21 and the second set of the interrupt interface 341b and bus interface circuitry 342b are also mutual connected and respectively connected to a standard bus of the navigation (INS) computer of the avionics system 60, and that the first bus interface circuitry 342a is connected to the second bus interface circuitry 342b.

According to the requirements of the IMU output signals, we designed different types of signal generation circuits to produce a specific type of signal required by a specific simulation task. These signal generation circuits are designed as a series of optional modules. Signal module design is based on the modularized IMU emulation computer 21 architecture design. In this design, the entire IMU emulation computer is re-configurable. According to the practical IMU product to be simulated, we can choose a type of the signal generation board to produce the required electronic signals that will be injected into a INS computer of the GNC avionics on-board vehicle 60.

The Ethernet network controller board 40 is used to receive real-time vehicle flight trajectory data from the 6DOF trajectory generator. The 6DOF trajectory generator 10 and the real-time IMU emulation system 20 can also been connected by a standard serial communication port such as RS-422/485, according to the application requirement.

As shown in FIGS. 3 to 5, the signal regulator and connector board 50 is used to convert the electronic signals produced by the signal generator into the required electrical specifications and form a suitable connector so that they can be directly injected into the installed INS computer of the GNC avionics on-board vehicle 60. The signal regulator and connector board 50 is designed for the specific user according to the specific IMU used in the system. For a specific IMU, we designed a connector board to match it. This is because even if two IMUs have the same type of signal, they may have different signal ranges, scale factors, voltages, currents, and different connector arrangements. It usually consists of an amplifier, a buffer, a coupler and sometimes logic. Of course, it also forms a suitable connector for the specific installed system in order to replace the real IMU directly.

The real-time simulation and electronic signal generation are inherently complex issues since the real IMU in the INS system is a self-contained device. It produces inertial measurements by itself, so it does not need to receive any signal from the outside. Accordingly, when the vehicle is stationary, its outputs are constant, so that in the simulated ground test of the installed avionics system 60, the real IMU in the vehicle has to be separated from the system and replaced by the IMU emulation system. This replacement inherently causes an intrusion to the installed avionics system 60.

Moreover, at present, there is no interface standard for IMU signals and connectors and there are many types of gyros and accelerometers which are fabricated by different manufacturers and have various signal types and connector requirements. Therefore, the core technology in the IMU emulation system is the electronic signal generation and its interface(s) to the installed avionics system 60. The software implements the IMU measurement modules and error modules according to the real-time flight trajectory data, sensor models and parameters. The hardware converts the simulated IMU outputs into electronic signals and injects the signals into the installed avionics system 60. The injected signals must be compatible with the electronics of the on-board INS/GPS system and the injection method must present the least intrusion to the installed avionics system 60. The real-time IMU emulation system 20 is a practical equipment that resolves all these problems.

Generally, real IMU outputs one of the four types of output signals, i.e. analog signals, serial digital signals, pulse signals, or parallel digital signals. According to the IMU output signals, a specific type of signal generation circuits are incorporated in the real-time IMU emulation system 20 of the present invention to produce a specific type of signal for a specific simulation task. These signal generation circuits can be designed as a series of optional signal interfaces, the analog signal interface 31, the serial signal interface 32, the pulse signal interface 33, or the parallel digital signals 34 as disclosed above. The designation of the signal interface is based on the modularized IMU emulation system architecture design. In the present invention, the entire IMU emulation computer 21 is reconfigurable.

The signal regulator and connector board 50 is designed for the specific user according to the specific IMU used in the installed avionics (GNC) system 60. This is because even if two IMUs have the same type of signal, they often have different signal ranges, scale factors, voltages, currents, and different connector arrangements. It forms a suitable connector for the specific installed avionics system 60 in order to replace the real IMU directly.

Therefore, in the modularized architecture design of the real-time IMU emulation system 20, the hardware modules fall into three levels:

(1) Level 1: Basic modules, including the processor module, memory modules, and communication modules. This level of modules is required for all types of IMU simulation.

(2) Level 2: Optional modules, the IMU signals are currently classified into four types, and accordingly four types of signal modules are used, i.e. the analog signal interface 31, the serial signal interface 32, the pulse signal interface 33, and the parallel digital signal interface 34. For a specific IMU simulation task, we usually do not need all the four optional signal generation interfaces. One or two signal generation interfaces are selected according to the signal type of the specific IMU.

(3) Level 3: User specific module, the signal regulator and connector boards. This level of modules is designed for the exact IMU to be simulated according to its signal specifications and connector arrangement.

It is worth to mention that the software of the real-time IMU emulation system 20 can be modified to produce more efficient user interface and even include a 6DOF trajectory generator in the real-time IMU emulation system 20.

Referring to FIG. 1. a test analysis system 70 is further independently connected between the 6DOF trajectory generator 10 and the GNC avionics on-board vehicle 60, wherein a reference trajectory is sent to the test analysis system 70 which is compared with on-board system solutions. The comparison of trajectory is used in two circumstances, one is for the real-time IMU emulation system 20 accuracy verification, the other is used in a practical test to evaluate the performances of the integrated GPS/INS navigation system of the vehicle 60.

In view of the real-time IMU emulation system 20 accuracy verification, when the user intends to use the real-time IMU emulation system 20 in a test system, a question may arise as to whether the real-time IMU emulation system 20 can provide an accurate emulation of the real IMU in actual dynamic flight. In the design of the real-time emulation system 20, a set of validation test methods have been embedded to verify the emulation accuracy of the real-time IMU emulation system 20 by itself or through coordination with other reference systems. This method can be used to verify the correctness of the IMU modules. In order to test the hardware of the IMU signal generator 30, however, an independent INS can be used.

The primary aims of the validation test are to verify the correctness of the IMU measurement modules and the fidelity of the IMU error modules, wherein the IMU measurement modules and error modules are a group of software programs used to produce IMU data according to the input 6DOF trajectory and user defined IMU error parameters. The IMU measurement module consists of the gyro measurement module 212 and accelerometer measurement module 213 which are based on the gyro and accelerometer mathematical models respectively. The IMU error module consists of the gyro error module 211 and the accelerometer error module 214 which are based on the gyro and accelerometer error modules respectively. The gyro and accelerometer measurement models describe the relationship between the motion of the vehicle and the outputs of the sensors. The gyro and accelerometer error modules describe the performance of the actual sensors used in the GNC system to be tested. The present invention uses a group of error parameters to describe the IMU performance, which is easy for a user to define.

Since the real-time IMU emulation system 20 comprises a microcomputer (the IMU emulation computer 21) and the associated electronic circuits and emulation software, the hardware test is an integrated part for the real-time IMU emulation system 20 validation.

It is noted that the IMU measurement modules 212, 213 in the IMU emulation computer 21 and the INS navigation algorithms can be regarded as two processes that are mutually inverse. The IMU measurement modules 212, 213 convert the ideal flight trajectory into IMU inertial measurement outputs, and the INS navigation algorithms convert the inertial measurements back into the resolved flight trajectory. Comparing the differences between the ideal trajectory and the resolved trajectory, we can determine the errors in the experimental system. If the flight simulator trajectory and the INS navigation solution are expressed in the same frame, they can be directly compared to determine the IMU emulation computer 21 errors or the IMU sensor induced errors.

The differences between the ideal flight states and their corresponding navigation solutions indicate the emulation errors. Of course, the INS navigation algorithm errors and computation errors are also merged into the IMU emulation computer 21 errors in this method. So an accurate algorithm and computation in the INS are required in the test. Generally a verified inertial grade INS computer system is accurate enough for the validation of the IMU emulation computer 21.

In view of the performance evaluation of the integrated GPS/INS navigation system, the data produced by the 6DOF trajectory generator is the ideal reference for the test mission. Using the simulated real-time IMU signals, the GPS/INS integrated system can resolve a vehicle trajectory. Comparing the ideal trajectory and the system resolved trajectory, we can evaluate the performance of the integrated system. Usually, the 6DOF trajectory can produce the following flight data:

(1) Emulation time tag.
(2) Geodetic position, including altitude, longitude, and height above sea level.
(3) Position vector in ECIZ (an Earth Centered Inertial) frame.
(4) Velocity vector in ECIZ frame.
(5) Acceleration vector in ECIZ frame.
(6) Rotation matrix from ECIZ to the B (Body) frame.
(7) Angular velocity vector observed in ECIZ and resolved in the B frame.
(8) Angular acceleration vector observed in ECIZ and resolved in the B frame.

The integrated GPS/INS can produce following outputs:

(1) Geodetic position, including altitude, longitude, and height above sea level.
(2) Velocity vector in N frame.
(3) Acceleration vector in N frame.
(4) Rotation matrix from N to the B (Body) frame.
(5) Angular velocity vector observed in N and resolved in the B frame.

It is noted that after some coordinate system transformations, most of the trajectory variables can be directly compared. Generally, we can obtain (1) the position accuracy, (2) the altitude accuracy, (3) the heading accuracy, (4) the attitude accuracy, and (5) the velocity accuracy for the system performance evaluation

What is claimed is:

1. A real-time IMU emulation method for GNC system, comprising the steps of:

(a) inputting IMU measurement modules and IMU error modules into a real-time IMU emulation system according to a real IMU device of an on-board GNC system to be tested, wherein said IMU measurement modules comprises Gyro measurement model and accelerometer measurement model which are determined by inertial sensor principles, and that said IMU error modules comprises Gyro error module and accelerometer error module which are defined by a user according to an actual IMU used in said on-board GNC system to be tested;

(b) producing real-time trajectory data from a 6DOF trajectory generator and sending said real-time trajectory data to said real-time IMU emulation system, wherein said real-time trajectory data are defined by said user and said real-time IMU emulation system produces IMU signals as if a vehicle is really transporting along a trajectory defined by said user;

(c) generating output data that are real-time IMU data identical to said real IMU device in a designated mission by said IMU model of said real-time IMU emulation system, wherein said real-time IMU data are determined by said 6DOF trajectory data, said IMU measurement modules, and said IMU error modules;

(d) converting said real-time IMU data into Simulated IMU electronic signals by an IMU signal generator in a simulator of said real-time IMU emulation system, wherein said IMU signal generator is an interface board in said emulation computer for producing said Simulated IMU electronic signals which are identical to that produced by said real IMU in said on-board GNC system;

(e) processing said generated Simulated IMU electronic signals by a regulator and connector circuit to form suitable electrical specifications and connector pin arrangement that is compatible to a GNC/IMU interface; and (f) injecting said electronic signals into said on-board GNC system to excite said on-board GNC system, wherein with said dynamic 6DOF trajectory and compatible electronic signals, said real-time IMU emulation system provides same IMU signals as a real IMU on a transporting carrier, and that when said on-board GNC system is excited in dynamic operation, a performance thereof is able to be tested and evaluated as if carrying out a real transportation test.

2. A real-time IMU emulation method for On-board GNC system, as recited in claim 1, after the above step (f), further comprising an additional step of collecting test data from said on-board GNC system by a computer system connected between said 6DOF trajectory generator and said on-board GNC system, so as to compare said real-time trajectory data from said 6DOF trajectory generator with a GNC resolved vehicle trajectory data output from said on-board GNC system in order to determine if said on-board GNC system works properly and to evaluate its performance.

3. A real-time IMU emulation system, as recited in claim 2, wherein said IMU measurement modules and error modules are a group of software programs used to produce IMU data according to said input trajectory data and defined IMU error parameters by the user, wherein said Gyro measurement module and said accelerometer measurement module which are based on Gyro and accelerometer mathematical modules respectively, and said Gyro error module and said accelerometer error module are based on Gyro and accelerometer error modules respectively, wherein said gyro and accelerometer measurement modules describe a relationship between a motion of said GNC avionics on-board vehicle and outputs of sensors used in said on-board GNC system to be tested, and that said Gyro and accelerometer error modules describe the performance of said sensors.

4. A real-time IMU emulation system, which is connected between a GNC avionics on-board vehicle for bypassing a real IMU in an on-board GNC system of said vehicle and a 6DOF trajectory generator for producing a real-time trajectory data to send to said real-time IMU emulation system, comprising:

an IMU emulation computer which is a computation platform for said real-time IMU emulation system, to which a plurality of off-the-shelf open standard bus modules, including IMU measurement modules and IMU error modules, are defined by a user and input according to said real IMU of said GNC system, wherein said IMU measurement modules include Gyro measurement module and accelerometer measurement module and said IMU error modules include Gyro error module and accelerometer error module, wherein said real-time trajectory data are sent to said IMU emulation computer which generates real-time IMU data;

an IMU signal generator, which is installed between said IMU emulation computer and said on-board GNC system to be tested, for converting said real-time IMU data into simulated IMU electronic signals which are able to be injected into said on-board GNC system and are identical to said real IMU in said on-board GNC system of said vehicle during a designated mission and are determined by said real-time trajectory data, said IMU measurement modules and said IMU error modules;

a regulator and connector circuit for processing said Simulated IMU electronic signals to form corresponding electrical specifications and connector pin arrangement, wherein said simulated IMU electronic signals are injected into said on-board GNC system to excite said on-board GNC system, thereby with said dynamic trajectory signals and said compatible simulated IMU electronic signals, said real-time IMU emulation system provides same IMU signals as a real IMU on a transporting carrier, so that the performance of said on-board GNC system is able to be tested and evaluated as if said on-board GNC system is carrying out a real transportation test when said on-board GNC system is excited in dynamic operation.

5. A real-time IMU emulation system, as recited in claim 4, wherein said IMU measurement modules and error modules are a group of software programs used to produce IMU data according to said input trajectory data and defined IMU error parameters by the user, wherein said Gyro measurement module and said accelerometer measurement module which are based on Gyro and accelerometer mathematical modules respectively, and said Gyro error module and said accelerometer error module are based on Gyro and accelerometer error modules respectively, wherein said gyro and accelerometer measurement modules describe a relationship between a motion of said GNC avionics on-board vehicle and outputs of sensors used in said on-board GNC system to be tested, and that said Gyro and accelerometer error modules describe the performance of said sensors.

6. A real-time IMU emulation system, as recited in claim 4, wherein said IMU electronic signal generator includes an analog signal interface which is a multi-channel D/A converter circuit board for generating analog IMU signals, which comprises a bus interface circuitry, a DMA interface and an interrupt interface respectively connected to a standard bus of said IMU emulation computer, said analog signal interface further comprising a FIFO circuitry connected with said bus interface circuitry, a multi-channel D/A converter circuitry connected between said FIFO circuitry and an analog signal regulator and/or isolator of said signal regulator and connector board, and a timing circuitry connected between said DMA interface and said multi-channel D/A converter circuitry.

7. A real-time IMU emulation system, as recited in claim 5, wherein said IMU electronic signal generator includes an analog signal interface which is a multi-channel D/A converter circuit board for generating analog IMU signals, which comprises a bus interface circuitry, a DMA interface and an interrupt interface respectively connected to a standard bus of said IMU emulation computer, said analog signal interface further comprising a FIFO circuitry connected with said bus interface circuitry, a multi-channel D/A converter circuitry connected between said FIFO circuitry and an analog signal regulator and/or isolator of said signal regulator and connector board, and a timing circuitry connected between said DMA interface and said multi-channel D/A converter circuitry.

8. A real-time IMU emulation system, as recited in claim 4, wherein said IMU electronic signal generator includes a serial signal interface which is a communication control circuit board for generating serial IMU signals, which comprises a bus interface circuitry connected with said standard bus of said IMU emulation computer, an interrupt interface connected between said bus interface circuitry and said standard bus of said IMU emulation computer, a discrete logic circuitry connected between said bus interface circuitry and a serial signal regulator and connector of said signal regulator and connector board, and an interface circuitry connected between said bus interface circuitry and said signal regulator and connector of said signal regulator and connector board.

9. A real-time IMU emulation system, as recited in claim 5, wherein said IMU electronic signal generator includes a serial signal interface which is a communication control circuit board for generating serial IMU signals, which comprises a bus interface circuitry connected with said standard bus of said IMU emulation computer, an interrupt interface connected between said bus interface circuitry and said standard bus of said IMU emulation computer, a discrete logic circuitry connected between said bus interface circuitry and a serial signal regulator and connector of said signal regulator and connector board, and an interface circuitry connected between said bus interface circuitry and said signal regulator and connector of said signal regulator and connector board.

10. A real-time IMU emulation system, as recited in claim 6, wherein said IMU electronic signal generator further includes a serial signal interface which is a communication control circuit board for generating serial IMU signals, which comprises a bus interface circuitry connected with said standard bus of said IMU emulation computer, an interrupt interface connected between said bus interface circuitry and said standard bus of said IMU emulation computer, a discrete logic circuitry connected between said bus interface circuitry and a serial signal regulator and connector of said signal regulator and connector board, and an interface circuitry connected between said bus interface circuitry and said signal regulator and connector of said signal regulator and connector board.

11. A real-time IMU emulation system, as recited in claim 7, wherein said IMU electronic signal generator further includes a serial signal interface which is a communication control circuit board for generating serial IMU signals, which comprises a bus interface circuitry connected with said standard bus of said IMU emulation computer, an interrupt interface connected between said bus interface circuitry and said standard bus of said IMU emulation computer, a discrete logic circuitry connected between said bus interface circuitry and a serial signal regulator and connector of said signal regulator and connector board, and an interface circuitry connected between said bus interface circuitry and said signal regulator and connector of said signal regulator and connector board.

12. A real-time IMU emulation system, as recited in claim 4, wherein said IMU electronic signal generator includes a pulse signal interface which is a multi-channel digital controlled frequency generator circuit board for producing pulse IMU signals, which comprises bus interface circuitry connected with said standard bus of said IMU emulation computer, an interrupt interface connected between said bus interface circuitry and said standard bus of said IMU emulation computer, a multi-channel digital to frequency convert circuitry connected with said bust interface circuitry, and a Inc/Dec pulse separation circuitry connected between said multi-channel digital to frequency convert circuitry and a pulse signal regulator and connector of said signal regulator and connector board.

13. A real-time IMU emulation system, as recited in claim 5, wherein said IMU electronic signal generator includes a pulse signal interface which is a multi-channel digital controlled frequency generator circuit board for producing pulse IMU signals, which comprises bus interface circuitry connected with said standard bus of said IMU emulation computer, an interrupt interface connected between said bus interface circuitry and said standard bus of said IMU emulation computer, a multi-channel digital to frequency convert circuitry connected with said bust interface circuitry, and a Inc/Dec pulse separation circuitry connected between said multi-channel digital to frequency convert circuitry and a pulse signal regulator and connector of said signal regulator and connector board.

14. A real-time IMU emulation system, as recited in claim 10, wherein said IMU electronic signal generator further includes a pulse signal interface which is a multi-channel digital controlled frequency generator circuit board for producing pulse IMU signals, which comprises bus interface circuitry connected with said standard bus of said IMU emulation computer, an interrupt interface connected between said bus interface circuitry and said standard bus of said IMU emulation computer, a multi-channel digital to frequency convert circuitry connected with said bust interface circuitry, and a Inc/Dec pulse separation circuitry connected between said multi-channel digital to frequency convert circuitry and a pulse signal regulator and connector of said signal regulator and connector board.

15. A real-time IMU emulation system, as recited in claim 11, wherein said IMU electronic signal generator includes a pulse signal interface which is a multi-channel digital controlled frequency generator circuit board for producing pulse IMU signals, which comprises bus interface circuitry connected with said standard bus of said IMU emulation computer, an interrupt interface connected between said bus interface circuitry and said standard bus of said IMU emulation computer, a multi-channel digital to frequency convert circuitry connected with said bust interface circuitry, and a Inc/Dec pulse separation circuitry connected between said multi-channel digital to frequency convert circuitry and a pulse signal regulator and connector of said signal regulator and connector board.

16. A real-time IMU emulation system, as recited in claim 4, wherein said IMU electronic signal generator includes a parallel digital signal interface which comprises two sets of interrupt interfaces and bus interface circuitries, wherein said first set of said interrupt interface and bus interface circuitry are mutual connected and respectively connected to said standard bus of IMU emulation computer, and said second set of said interrupt interface and bus interface circuitry are also mutual connected and respectively connected to a standard bus of said navigation (INS) computer of said on-board GNC system, and that said first bus interface circuitry is connected to said second bus interface circuitry.

17. A real-time IMU emulation system, as recited in claim 5, wherein said IMU electronic signal generator includes a parallel digital signal interface which comprises two sets of interrupt interfaces and bus interface circuitries, wherein said first set of said interrupt interface and bus interface circuitry are mutual connected and respectively connected to said standard bus of IMU emulation computer, and said second set of said interrupt interface and bus interface circuitry are also mutual connected and respectively connected to a standard bus of said navigation (INS) computer of said on-board GNC system, and that said first bus interface circuitry is connected to said second bus interface circuitry.

18. A real-time IMU emulation system, as recited in claim 14, wherein said IMU electronic signal generator further includes a parallel digital signal interface which comprises two sets of interrupt interfaces and bus interface circuitries, wherein said first set of said interrupt interface and bus interface circuitry are mutual connected and respectively connected to said standard bus of IMU emulation computer, and said second set of said interrupt interface and bus interface circuitry are also mutual connected and respectively connected to a standard bus of said navigation (INS) computer of said on-board GNC system, and that said first bus interface circuitry is connected to said second bus interface circuitry.

19. A real-time IMU emulation system, as recited in claim 15, wherein said IMU electronic signal generator further includes a parallel digital signal interface which comprises two sets of interrupt interfaces and bus interface circuitries wherein said first set of said interrupt interface and bus interface circuitry are mutual connected and respectively connected to said standard bus of IMU emulation computer, and said second set of said interrupt interface and bus interface circuitry are also mutual connected and respectively connected to a standard bus of said navigation (INS) computer of said on-board GNC system, and that said first bus interface circuitry is connected to said second bus interface circuitry.

20. A real-time IMU emulation system, as recited in claim 4, further comprising an Ethernet network controller board for receiving said real-time trajectory data from said 6DOF trajectory generator, wherein said 6DOF trajectory generator and said real-time IMU emulation system are connected by a serial communication port.

21. A real-time IMU emulation system, as recited in claim 5, further comprising an Ethernet network controller board for receiving said real-time trajectory data from said 6DOF trajectory generator, wherein said 6DOF trajectory generator and said real-time IMU emulation system are connected by a serial communication port.

22. A real-time IMU emulation system, as recited in claim 6, further comprising an Ethernet network controller board for receiving said real-time trajectory data from said 6DOF trajectory generator, wherein said 6DOF trajectory generator and said real-time IMU emulation system are connected by a serial communication port.

23. A real-time IMU emulation system, as recited in claim 7, further comprising an Ethernet network controller board for receiving said real-time trajectory data from said 6DOF trajectory generator, wherein said 6DOF trajectory generator and said real-time IMU emulation system are connected by a serial communication port.

24. A real-time IMU emulation system, as recited in claim 10, further comprising an Ethernet network controller board for receiving said real-time trajectory data from said 6DOF trajectory generator, wherein said 6DOF trajectory generator and said real-time IMU emulation system are connected by a serial communication port.

25. A real-time IMU emulation system, as recited in claim 11, further comprising an Ethernet network controller board for receiving said real-time trajectory data from said 6DOF trajectory generator, wherein said 6DOF trajectory generator and said real-time IMU emulation system are connected by a serial communication port.

26. A real-time IMU emulation system, as recited in claim 14, further comprising an Ethernet network controller board for receiving said real-time trajectory data from said 6DOF trajectory generator, wherein said 6DOF trajectory generator and said real-time IMU emulation system are connected by a serial communication port.

27. A real-time IMU emulation system, as recited in claim 15, further comprising an Ethernet network controller board for receiving said real-time trajectory data from said 6DOF trajectory generator, wherein said 6DOF trajectory generator and said real-time IMU emulation system are connected by a serial communication port.

28. A real-time IMU emulation system, as recited in claim 18, further comprising an Ethernet network controller board for receiving said real-time trajectory data from said 6DOF trajectory generator, wherein said 6DOF trajectory generator and said real-time IMU emulation system are connected by a serial communication port.

29. A real-time IMU emulation system, as recited in claim 19, further comprising an Ethernet network controller board for receiving said real-time trajectory data from said 6DOF trajectory generator, wherein said 6DOF trajectory generator and said real-time IMU emulation system are connected by a serial communication port.

30. A real-time IMU emulation system, as recited in claim 4, further comprising a test analysis system which is further independently connected between said 6DOF trajectory generator and said on-board GNC system, wherein a reference trajectory is sent to said test analysis system which is compared with on-board system solutions.

31. A real-time IMU emulation system, as recited in claim 5, further comprising a test analysis system which is further independently connected between said 6DOF trajectory generator and said on-board GNC system, wherein a reference trajectory is sent to said test analysis system which is compared with on-board system solutions.

32. A real-time IMU emulation system, as recited in claim 6, further comprising a test analysis system which is further independently connected between said 6DOF trajectory generator and said on-board GNC system, wherein a reference trajectory is sent to said test analysis system which is compared with on-board system solutions.

33. A real-time IMU emulation system, as recited in claim 7, further comprising a test analysis system which is further independently connected between said 6DOF trajectory generator and said on-board GNC system, wherein a reference trajectory is sent to said test analysis system which is compared with on-board system solutions.

34. A real-time IMU emulation system, as recited in claim 10, further comprising a test analysis system which is further independently connected between said 6DOF trajectory generator and said on-board GNC system, wherein a reference trajectory is sent to said test analysis system which is compared with on-board system solutions.

35. A real-time IMU emulation system, as recited in claim 11, further comprising a test analysis system which is further independently connected between said 6DOF trajectory generator and said on-board GNC system, wherein a reference trajectory is sent to said test analysis system which is compared with on-board system solutions.

36. A real-time IMU emulation system, as recited in claim 14, further comprising a test analysis system which is further independently connected between said 6DOF trajectory generator and said on-board GNC system, wherein a reference trajectory is sent to said test analysis system which is compared with on-board system solutions.

37. A real-time IMU emulation system, as recited in claim 15, further comprising a test analysis system which is further independently connected between said 6DOF trajectory generator and said on-board GNC system, wherein a reference trajectory is sent to said test analysis system which is compared with on-board system solutions.

38. A real-time IMU emulation system, as recited in claim 18, further comprising a test analysis system which is further independently connected between said 6DOF trajectory generator and said on-board GNC system, wherein a reference trajectory is sent to said test analysis system which is compared with on-board system solutions.

39. A real-time IMU emulation system, as recited in claim 19, further comprising a test analysis system which is further independently connected between said 6DOF trajectory generator and said on-board GNC system, wherein a reference trajectory is sent to said test analysis system which is compared with on-board system solutions.

* * * * *